US012385300B2

(12) United States Patent
Alfredsson et al.

(10) Patent No.: US 12,385,300 B2
(45) Date of Patent: Aug. 12, 2025

(54) FITTING FOR AN OPENABLE ELEMENT

(71) Applicant: Industrilas i Nassjo Aktiebolag, Nassjo (SE)

(72) Inventors: Bengt-Ake Alfredsson, Bodafors (SE); Tye Sonney, Minneapolis, MN (US)

(73) Assignee: Industrilas I Nassjo Aktiebolag, Nassjo (SE)

( * ) Notice: Subject to any disclaimer, the term of this patent is extended or adjusted under 35 U.S.C. 154(b) by 114 days.

(21) Appl. No.: 18/560,041

(22) PCT Filed: May 4, 2022

(86) PCT No.: PCT/EP2022/061975
§ 371 (c)(1),
(2) Date: Nov. 9, 2023

(87) PCT Pub. No.: WO2022/238199
PCT Pub. Date: Nov. 17, 2022

(65) Prior Publication Data

US 2024/0229524 A1 Jul. 11, 2024

(30) Foreign Application Priority Data

May 10, 2021 (EP) .................................... 21173071

(51) Int. Cl.
*E05C 3/04* (2006.01)
*E05B 9/08* (2006.01)
*E05C 3/00* (2006.01)

(52) U.S. Cl.
CPC ................ *E05C 3/042* (2013.01); *E05B 9/08* (2013.01); *E05C 3/004* (2013.01)

(58) Field of Classification Search
CPC ... E05B 9/08; E05B 1/003; E05B 3/04; E05B 13/002; E05B 13/10; E05B 13/106;
(Continued)

(56) References Cited

U.S. PATENT DOCUMENTS 2,950,141 A * 8/1960 Koff .................... F16B 13/0808 292/256.73
3,904,160 A * 9/1975 Biddle ..................... G12B 9/10 248/27.3
(Continued)

FOREIGN PATENT DOCUMENTS

DE 3439134 A * 5/1986 ......... B65D 90/0013
DE 9302385 U1 * 5/1993 ........... G09B 23/185
(Continued)

*Primary Examiner* — Kristina R Fulton
*Assistant Examiner* — Steven A Tullia
(74) *Attorney, Agent, or Firm* — Volpe Koenig

(57) ABSTRACT

The present disclosure relates to a fitting for an openable element such as a door, locker, hatch, window, or the like, and an openable element preferably comprising the fitting. The fitting includes a housing arranged at one side of the openable element. A shaft extends from the housing, such that when the fitting is arranged to the openable element, the shaft extends through a hole image of the openable element. An actuation member is arranged on the shaft and rotatable relative to the housing. The fitting further includes a fixing member arranged axially along the shaft between the housing and the actuation member, such that the fixing member is rotatable relative to the housing and the shaft between an inserting position and a first fixing position.

18 Claims, 9 Drawing Sheets

(58) Field of Classification Search
CPC .... E05B 57/00; E05B 65/025; E05B 65/5253; E05C 3/042; E05C 3/004; Y10T 292/1083
See application file for complete search history.

(56) References Cited

U.S. PATENT DOCUMENTS

| | | | | | |
|---|---|---|---|---|---|
| 4,602,756 | A * | 7/1986 | Chatfield | F16M 11/045 | 403/80 |
| 4,627,249 | A * | 12/1986 | Dumortier | E02D 29/1427 | 292/204 |
| 5,076,748 | A * | 12/1991 | Waterfield | F16B 35/041 | 411/84 |
| 5,087,088 | A * | 2/1992 | Milam | E05C 5/00 | 292/110 |
| 5,593,265 | A * | 1/1997 | Kizer | F16B 21/02 | 403/348 |
| 5,737,950 | A * | 4/1998 | Yun-Bin | E05C 3/042 | 70/462 |
| 5,794,901 | A * | 8/1998 | Sigel | G09B 25/02 | 248/221.11 |
| 6,267,543 | B1 * | 7/2001 | David | F16B 21/02 | 411/549 |
| 6,508,092 | B1 * | 1/2003 | Laabs | E05B 9/084 | 248/222.12 |
| 6,612,795 | B2 * | 9/2003 | Kirchen | F16B 21/02 | 24/297 |
| 6,923,407 | B2 * | 8/2005 | Takeuchi | F16B 21/02 | 248/68.1 |
| 7,340,928 | B2 | 3/2008 | Hoffman | | |
| 8,465,242 | B2 * | 6/2013 | Arendt | F16B 7/187 | 411/85 |
| 8,985,959 | B1 * | 3/2015 | Kuykendall | F04D 29/34 | 416/210 R |
| 10,077,578 | B2 * | 9/2018 | Alfredsson | E05B 61/00 | |
| 11,041,520 | B2 * | 6/2021 | Sbongk | B60R 13/0243 | |
| 11,746,811 | B2 * | 9/2023 | Jones | E01C 5/005 | 403/380 |
| 11,752,634 | B2 * | 9/2023 | Everard | F16B 21/02 | 348/92 |

FOREIGN PATENT DOCUMENTS

| | | | | |
|---|---|---|---|---|
| DE | 20014656 | U1 * | 11/2000 | E05B 1/0007 |
| DE | 20019247 | U1 * | 1/2001 | E05B 51/023 |
| DE | 10243327 | A1 * | 4/2004 | E05B 9/084 |
| DE | 202004019694 | U1 * | 5/2006 | E05B 9/08 |
| EP | 0649955 | A1 * | 4/1995 | E05B 9/08 |
| EP | 1528190 | A1 | 5/2005 | |
| EP | 1818482 | A2 * | 8/2007 | E05B 13/002 |
| EP | 2944747 | A1 * | 11/2015 | E05B 61/00 |
| EP | 3330460 | A1 * | 6/2018 | E05B 15/0053 |
| FR | 2783010 | A1 | 3/2000 | |
| FR | 2819842 | A1 * | 7/2002 | E05B 9/084 |
| KR | 20170092268 | A * | 8/2017 | E05B 9/08 |

* cited by examiner

FITTING FOR AN OPENABLE ELEMENT

TECHNICAL FIELD

The present disclosure relates to a fitting for an openable element such as a door, locker, hatch, window or the like, and an openable element comprising a hole image adapted in shape and size for receiving said fitting.

BACKGROUND

Fittings in the prior art, e.g. handles or hinges, are conventionally securely arranged to an openable element such as a door, locker, hatch, window or the like using attachment means such as screws or nuts and bolts. Although this allows for the fittings to be secured in a satisfying manner to said openable element, it is a somewhat time-consuming installation process since the attachment means need to be secured individually. Rather than using manual tools such as a wrench or a screwdriver, a power-driven tool may be used. However, these are generally quite heavy—it is cumbersome to carry these to and from the installation location.

The attachment means may also introduce points of weaknesses, both in terms of structural integrity and in terms of security. Firstly, the structural integrity of the attachment means may degrade over time due to wear and tear. Secondly, the attachment means be tampered with so as to enable unauthorized access through said openable element.

A further problem is that fittings are usually designed to be specifically mounted to openable elements which are either left-hand operable or right-hand operable. Fittings are usually not designed to be reconfigurable after assembly to be mounted to either such openable elements. Fittings with such capability usually have a complicated structure with many moving parts, both small and large, which results in a more fragile fitting.

Thus, it is of interest to provide a new fitting which solves at least some of these identified problems of the prior art.

SUMMARY

It is an object of the present invention is to provide an improved solution that alleviates at least some of the mentioned drawbacks with present solutions. In particular, a first object of the present invention is to provide a fitting that is easy to install to an openable element. A second object of the invention is to provide a fitting which makes unauthorized access difficult. These objects are solved by the invention defined by claim 1.

A third object of the present invention is to provide a fitting that is reconfigurable after assembly for openable elements which are either right-hand operated or left-hand operated.

Furthermore, a fourth object is to provide an openable element with a hole image adapted in shape and size for receiving a fitting of the present invention.

By fitting, it may be meant a handle arrangement, a lock arrangement, a hinge arrangement or the like.

By openable element, it may be meant a door, a locker, a hatch, a window or the like. The openable element may be configured to be pivotable between an open position and a closed position. The openable element may be configured to be slidable between an open position and a closed position.

By right-hand operation, it may be meant that the openable element opens in the direction to the right as seen when facing the side of the openable element onto which the fitting is configured to be arranged, either by a pivoting motion or a sliding motion.

By left-hand operation, it may be meant that the openable element opens in the direction to the left as seen when facing the side of the openable element onto which the fitting is configured to be arranged, either by a pivoting motion or a sliding motion.

Alternatively, the openable element may be configured to open in a vertical direction, i.e. in an upwards direction or a downward direction, by a pivoting motion or by a sliding motion. The fitting of the present invention may be used for such an openable element as well.

According to a first aspect of the invention, a fitting for an openable element such as a door, locker, hatch, window or the like, is provided. The fitting comprises: a housing configured to be arranged at one side of said openable element; a shaft extending from the housing and configured so that, when the fitting is arranged to the openable element, the shaft extends through a hole image of the openable element; and an actuation member arranged on the shaft and rotatable relative said housing, the fitting further comprising a fixing member arranged axially along the shaft between the housing and the actuation member such that the fixing member is rotatable relative the housing and the shaft between an inserting position allowing the fixing member and the actuation member to be inserted into the hole image of the openable element when said fitting is being arranged to said openable element, and a first fixing position when the fixing member is rotated in a first rotational direction, in which position the fixing member engages with a fixing protrusion extending, when in use, from the housing through the hole image such that the fitting is compressively fixed to said openable element.

This fitting can be securely arranged to an openable element without attachment means such as screws or nuts and bolts. Instead, the fitting is configured to be securely arranged to the openable element by means of the fixing member and the fixing protrusion which together allows for the compressive fixing of the fitting to said openable element. In other words, the fitting is provided with premounted attachment means upon assembly. This allows for a toolless installation process. Thus, the fitting is easy to install to an openable element, thereby solving the first object of the invention.

By compressively fixing the fitting to said openable element, it may mean that the fixing member in the fixing position interacts with the fixing protrusion so that the fixing member is axially offset relative the shaft with an axial offset distance by which movement the fixing member pulls the housing towards the mounting surface of the openable element. The offset distance may be about 0.1-0.2 mm, 0.2-0.3 mm, 0.3-0.4 mm, 0.4-0.5 mm, 0.5-0.6 mm, 0.6-0.7 mm, 0.7-0.8 mm, 0.8-0.9 mm, or 0.9-1.0 mm.

Throughout the present disclosure, a tolerance of about 1-2%, 2-3%, 3-4%, or 4-5% is assumed with respect to specified values.

Further, the fixing member may be rotated from the fixing position to the inserting position by moving the actuation member in the opposite direction. Thereby, the fitting is also easy to remove from the openable element.

The side of the openable element onto which the fitting is arranged may be referenced as a mounting side. Generally, the mounting side of the openable element will be characterized by a mounting plane. The fitting may be configured to be arranged to the mounting plane such that the shaft extends substantially perpendicular to said mounting plane.

Consequently, the fixing member may be configured to rotate in a plane which is parallel to said mounting plane.

The shaft may define a first rotational axis about which the fixing member is configured to rotate. The first rotational direction may be a clockwise rotation about said first rotational axis, as seen when facing the side of the openable element onto which the fitting is arranged. The first rotational direction may be a counterclockwise rotation about said first rotational axis, as seen when facing the side of the openable element onto which the fitting is arranged. The direction of the first rotational direction may be selected depending on whether the fitting is to be arranged on a right-hand operated openable element or a left-hand operated openable element.

The hole image may comprise an insertion hole through which the actuation member and the fixing member when in the inserting position can be inserted. The hole image may comprise one or more fixing protrusion holes through which fixing protrusions from the housing may extend through. Some or all of the insertion hole and the respective one or more fixing protrusion holes may be connected via slots or not connected at all.

The actuation member may be a lever. The lever may be configured to be accessible from the side of the openable element opposite the side of the openable element onto which the fitting is arranged. The actuation member may be rotatable relative the housing by means of rotation of the shaft.

In the case where the fitting is a handle arrangement, the actuation member may in particular be a cam member. The cam member may be configured to move between a locking position in which it is extended to engage with a frame plate arranged to a frame of the openable element, and an unlocking position in which the cam member is retracted so as to allow the openable element to be opened.

The shaft may be provided with a plurality of axially segmented portions.

A first shaft portion which may be an end portion. The first shaft portion may be configured in shape and size so as to rotationally interlock with the actuation member. This may be done by means of the first shaft portion may have at least a first pair of mutually parallel sides in an axial cross section. The shaft may have two pairs of mutually parallel sides in an axial cross section. The actuation member may comprise a recess or through-hole adapted in size and shape to receive the first shaft portion such that the actuation member is rotationally interlocked with the shaft.

A second shaft portion may be an intermediate portion. The second shaft portion may be immediately adjacent to the first shaft portion. The second shaft portion may be configured in shape and size so as to allow the fixing member to freely rotate relative said second shaft portion. The second shaft portion may have a circular axial cross section. The second shaft portion may have a cylinder shape. The second shaft portion may comprise two cylindric portions with a groove arranged therebetween. The groove may be configured to receive a rubber gasket. The rubber gasket may be configured to provide friction to the fixing member when rotated.

A third shaft portion may be an end portion. The third shaft portion may be immediately adjacent to the second shaft portion. The third shaft portion may be configured in shape and size so as to axially couple to the housing but allow for the third shaft portion to be rotatable relative the housing.

The actuation member may be axially fixed to the shaft by means of a screw configured to engage with grooves of a bore extending at least partially through the shaft. In case the fitting is a handle arrangement, the bore may be a through-hole and the screw may be configured to extend through the shaft and engage with grooves of a bore of a handle, thereby rotationally and axially fixing the handle to the shaft. The third shaft portion may further comprise a plurality of handle engagement grooves for receiving handle connection members in said grooves, thereby adding support and further rotationally and axially fixing the handle to the shaft.

The first shaft portion, the second shaft portion and the third shaft portion may be axially and rotationally fixed relative each other. The first shaft portion, the second shaft portion and the third shaft portion may be formed as an integrated member.

According to an embodiment, the fixing member may be configured to be rotatable between the inserting position and the first fixing position by means of the actuation member. Since the actuation member may be used to actuate rotation of the fixing member between the inserting position and the first fixing position, and since the actuation member may also be inserted through the hole image, it may not be accessed from the same side of the openable element onto which the fitting is arranged. Thus, this design may allow for the fixing member to be prevented from being rotated into the inserting position from the side of the openable element onto which the fitting is arranged, thus preventing the fitting from being removed from the openable element. Thereby, unauthorized access into the openable element is prevented, thus solving the second object of the invention.

According to one embodiment, the fixing member is further rotatable between the inserting position and a second fixing position when the fixing member is rotated in a second rotational direction opposite the first rotational direction, in which position the fixing member engages with a fixing protrusion extending from the housing through the hole image such that the fitting is compressively fixed to said openable element.

By this, the fitting is reconfigurable for being arranged to openable elements which are either right-hand operated or left-hand operated, thereby solving the third object of the invention.

Similarly, the fitting may be reconfigurable for openable elements which either open in an upward direction or a downward direction.

According to one embodiment, the fixing member may be configured to be rotatable between the inserting position and the second fixing position by means of the actuation member.

According to one embodiment, the fixing member comprises an axial protrusion extending only partially in the circumferential direction about the shaft by which the fixing member is engageable with the actuation member.

By this, the actuation member may push onto the fixing member such that when the actuation member is rotated in the first direction from the inserting position, the fixing member is forced to rotate in the same direction as well. When the actuation member has forced the fixing member into the fixing position, the actuation member may freely rotate in the opposite direction in order to serve a different purpose. For instance, when the fitting is a handle arrangement, the actuation member may be a cam member. When the fixing member is in the fixing position, the cam member may be free to rotate between a locking position and an unlocking position, without engaging with the fixing member. The cam member may be configured to rotate between the locking position and the unlocking position by rotating a handle arranged to the shaft, thereby forcing rotation of the cam member as well.

Further, in the case wherein the fixing member is rotatable into two different fixing positions, the axial protrusion extending only partially in the circumferential direction about the shaft allows for free range of motion of the actuation member regardless whether the fixing member is moved into the first fixing position or the second fixing position. Further, the actuation member may easily rotate in a direction so as to force the fixing member to move from a fixing position to the inserting position, thus providing an easy way of removing the fitting from the door even when designed so as to being reconfigurable between right-hand operative use and left-hand operative use.

According to one embodiment, the axial protrusion is arc shaped, preferably having an arc length of about 75-105 degrees, preferably about 90 degrees. This particular shape is advantageous as it enables good contact between the actuation member and the fixing member when the fixing member is being rotated between the neural position and a fixing position. This particular shape is further relatively easy to manufacture when the actuation member comprises a main cylinder body as it substantially only involves cutting away a cylinder end piece from the main cylinder body of the fixing member. The specified preferable arc length is particularly advantageous in case of the fitting being designed for being reconfigurable between right-hand operative use and left-hand operative use.

According to one embodiment, the fixing member comprises one or more flanges configured to engage with an internal groove of the housing by which the fixing member is axially fixed to the housing relative the shaft. When the fixing member is moved from the inserting position to a fixing position, the flanges will push against the groove, thereby forcing the housing toward the mounting plane of the openable element. Moreover, in the case wherein the fixing protrusions form a part of the housing, these will be pushed through the hole image of the openable element, thereby enabling a compressive fixing of the fitting to the openable element.

The internal groove may extend in a circumferential direction along an interior surface of the housing, either partially or wholly around a center whole for receiving the shaft. The flanges may be two or more. In case there are only two flanges, they may be arranged on radially opposite sides of the fixing member.

The housing may be adapted in shape and size so that the hole for receiving the shaft has slots for axially receiving the flanges of the fixing member upon assembly.

The flanges may have slanted end surfaces configured to face the groove of the housing. This may facilitate the flanges of the fixing member to engage with the groove of the housing.

According to one embodiment, the fixing member further comprises a main cylinder body, and at least one radial portion extending from the main cylinder body by which the fixing member is engageable with the fixing protrusion corresponding to the first fixing position. By this, the fixing member may still have a cross sectional shape so as to enable it to be inserted into a main hole of the hole image of the openable element while also being able to reach a fixing protrusion located offset from the main hole of the hole image. Moreover, the radial portion may provide a large contact surface, thereby providing support for the fitting when compressively fixed to the openable element. The at least one radial portion may extend in a direction substantially perpendicular to a longitudinal extension direction of the main cylinder body. The longitudinal extension direction of the main cylinder body may coincide with a longitudinal extension direction of the shaft.

According to one embodiment, the fixing member further comprises at least two radial portions radially extending from two opposite sides of the main cylinder body by which the fixing member is engageable with a respective fixing protrusion corresponding to one of said fixing position(s). By this, support is added on opposite sides relative the shaft, thereby allowing the fixing to be more securely fixed to the door.

According to one embodiment, at least one of said at least one radial portions comprises a fixing recess for receiving said fixing protrusion wherein said fixing recess is adjacent to an elevated region causing said at least one radial portion to momentarily flex away from said fixing protrusion when said fixing protrusion is being received into said fixing recess. By this, the fixing protrusion and the fixing member may be coupled unless a torque of the fixing member exceeds a predetermined magnitude sufficient to dislocate the fixing member from a fixing protrusion. Thus, the fixing member may be prevented from accidentally dislocate from the fixing protrusion upon force impacts on the openable element and/or the fitting.

According to one embodiment, said elevated region tapers away in a radially perpendicular direction from said fixing recess. By this, the fixing member may more easily be inserted into a fixing position.

According to one embodiment, the fixing member comprises one or more supporting portions extending between the main cylinder body and each of the at least one radial portions. The supporting portions may prevent the radial portions from flexing too much upon interacting with the fixing protrusion.

According to one embodiment, the rotational angle of the fixing member when rotated between the inserting position and the first fixing position and/or between the inserting position and the second fixing position is about 90 degrees. By this, it may maximize the contact surface between the fixing member and an interior surface of the openable door. Moreover, it provides structural symmetry between right-hand operative use and left-hand operative use, thereby ensuring that the structural integrity of the device is the same regardless of the fitting is configured for right-hand operative use or left-hand operative use.

According to one embodiment, the fitting further comprises a push cylinder lock coupled with the shaft and configured to be received, when in a locking position, in a push cylinder lock recess of the housing, regardless whether the fixing member is moved into the first fixing position or the second fixing position. By this, the shaft may be rotationally fixated with the housing, thereby preventing rotation of the shaft relative the housing and consequently preventing the actuation member from being rotated. Moreover, in the case of the fitting being a handle arrangement, the push cylinder lock may be used to lock an openable element from being opened, regardless whether the openable element is configured for right-hand operative use or left-hand operative use. The push cylinder lock may be coupled to the shaft via a radially extending shaft portion comprising a recess for receiving the push cylinder lock. The radially extending shaft portion may extend from the third shaft portion of the shaft. Similarly, in the case of the fitting being a handle arrangement, the handle may have an opening through which the push cylinder lock may be operated.

According to one embodiment, the fitting further comprises a rotational stop block rotatably coupled with the actuation member and configured to slide along a predetermined groove of the housing having a length substantially corresponding to a half revolution of the actuation member. By this, the shaft may be prevented from rotating beyond a certain angle relative the housing. The rotational stop block may be a radial protrusion extending from the shaft. The rotational stop block may be a radial protrusion extending from the third shaft portion. The third shaft portion may have a substantially cylindric shape and the rotational stop block may extend from the cylindric surface in a radial direction. The rotational stop block may be arranged on an opposite side of the shaft relative the radially extending shaft portion comprising a recess for receiving the push cylinder lock.

According to one embodiment, the push cylinder lock recess for receiving the push cylinder is located on an opposite side of the shaft relative the predetermined groove at a midpoint of a circular arc extending between the endpoints of the groove of the housing.

According to a second aspect of the invention, an openable element is provided. The openable element comprises a hole image adapted in size and shape to receive the fitting according to the first aspect or any embodiments thereof. Preferably, the openable element comprises said fitting. The hole image may comprise a main hole configured to allow the actuation member and the fixing member when in an inserting position to be inserted therethrough. The main hole may have an elongated shape. The main hole may have a rectangular shape. The hole image may comprise a fixing protrusion hole located adjacent to said main hole. The hole image may comprise two fixing protrusion holes arranged on opposite sides of the main hole. The one or more fixing protrusion holes may have a shape corresponding to the cross-sectional shape of the fixing protrusions. In the case wherein the fixing protrusions have a circular cross section, the one or more fixing protrusion holes may be circular holes.

The invention is defined by the appended independent claims, with embodiments being set forth in the appended dependent claims, in the following description and in the drawings.

BRIEF DESCRIPTION OF THE DRAWINGS

The invention will in the following be described in more detail with reference to the enclosed drawings, wherein.

DESCRIPTION OF EMBODIMENTS

Figure 1A:
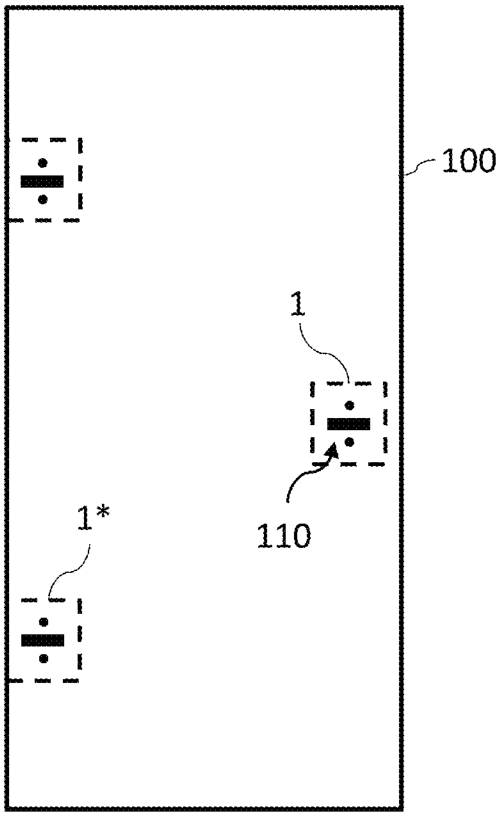
FIG. 1*a* shows a front view of an openable element configured for left-hand operative use, the openable element comprising a fitting according to one embodiment of the invention.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figure 1B:
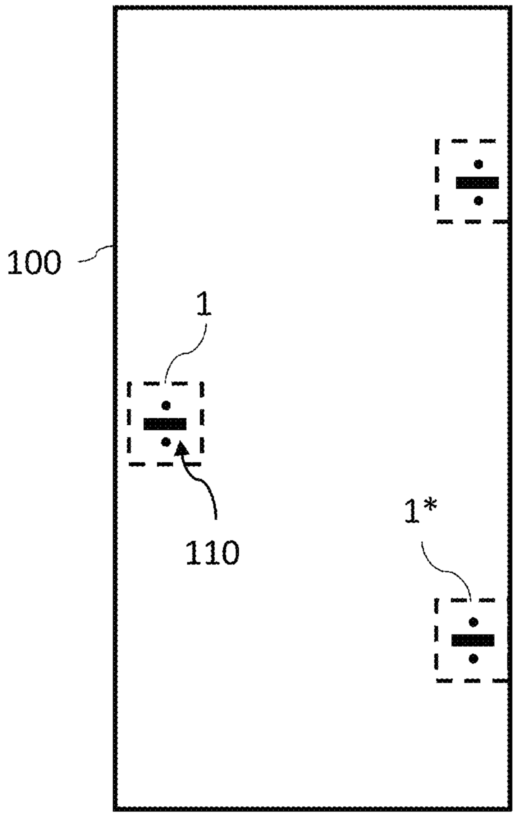
FIG. 1*b* shows a front view of an openable element configured for right-hand operative use, the openable element comprising a fitting according to one embodiment of the invention.
Figure 1C:
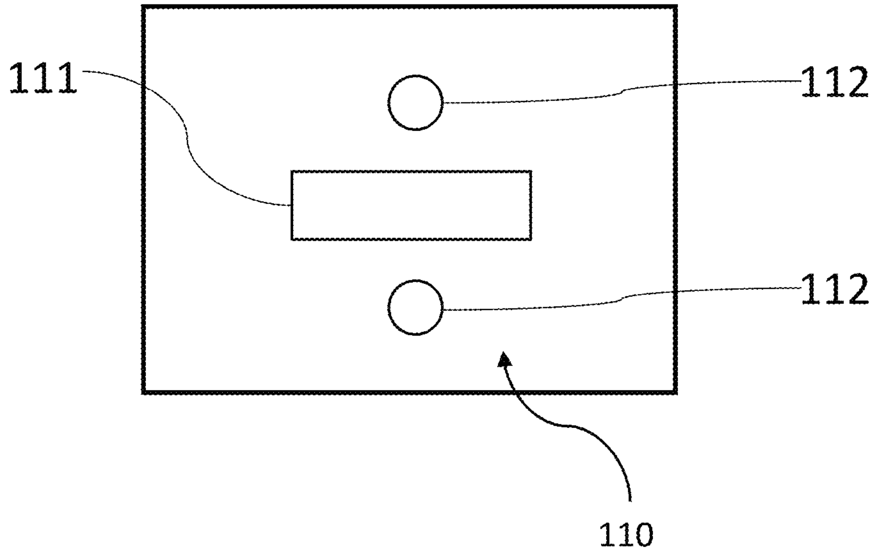
FIG. 1*c* shows a partial front view of an openable element and the hole image according to one embodiment of the invention.

The fitting according to one embodiment of the invention is configured to be arranged to an openable element such as a door, locker, hatch, window or the like. In FIGS. 1*a*-1*b*, the fitting 1 is mounted to a mounting plane of an openable element, in this case a door 100. In FIG. 1*a*, the fitting is arranged to a door 100 configured for left-hand operative use, meaning it opens in the direction to the left. In FIG. 1*b*, the fitting 1 is arranged to a door 100 configured for right-hand operative use, meaning it opens in the direction to the right. The fitting 1 may be configured either as a handle arrangement 1 or a hinge arrangement 1* as indicated in FIGS. 1*a*-1*b* respectively. The openable element 100, in this case a door, is adapted with a hole image 110 for receiving the fitting 1.

The fitting 1 according to one embodiment is illustrated in FIGS. 2-5 and is implemented as a handle arrangement. According to one embodiment, the fitting 1 comprises a housing 2 configured to be arranged at one side of said openable element. The fitting 1 comprises a shaft 7 extending from the housing 2 and configured so that when the fitting 1 is arranged to the openable element 100, the shaft 7 extends through a hole image 110 of the openable element 100. The fitting 1 further comprises an actuation member 5 arranged on the shaft and rotatable relative the housing 2. The fitting 1 further comprises a fixing member 4 arranged axially along the shaft 7 between the housing 2 and the actuation member 5 such that the fixing member 4 is rotatable relative the housing 2 and the shaft 7 between an inserting position allowing the fixing member 4 and the actuation member 5 to be inserted into the hole image 110 when said fitting is being arranged to said openable element 100, and a first fixing position when the fixing member 4 is rotated in a first rotational direction, in which position the fixing member 4 engages with a fixing protrusion 21 extending from the housing 2 through the hole image 110 such that the fitting 1 is compressively fixed to said openable element 100. The fixing member 4 is configured to be rotatable between the inserting position and the first fixing position by means of the actuation member 5.

Upon arranging the fitting 1 to an openable element 100, such as a door as illustrated in FIGS. 1*a*-1*b*, the fitting 1 is configured so that the fixing member 4 is positioned in an inserting position. In this position, the fixing member 4 together with the actuation member 5 may be inserted into the hole image 110, in particular through an insertion hole 111 of the hole image 110. In FIGS. 1*a*-1*b*, the insertion hole 111 of the hole image 110 is a rectangular opening. Moreover, upon arranging the fitting 1 to the openable element 100, the fixing protrusions 21 are also placed into the hole image, in particular so that they extend through a respective fixing protrusion hole 112. The respective fixing protrusion are arranged on opposing sides of the insertion hole 111. In FIGS. 1*a*-1*b*, the hole image 110 comprises two fixing protrusion holes 112 symmetrically arranged about the insertion hole 111.

Thus, when the fixing member 4 is rotated from the inserting position to a fixing position by means of the actuation member 5, in which position the fixing member 4 engages with at least one fixing protrusion 21, the fitting 1 is securely fixed to said openable element.

Thereby, the fitting 1 can be securely arranged to an openable element without attachment means such as screws or nuts and bolts. This allows for a toolless installation process. Thus, the fitting is easy to install to an openable element.

Figure 2:
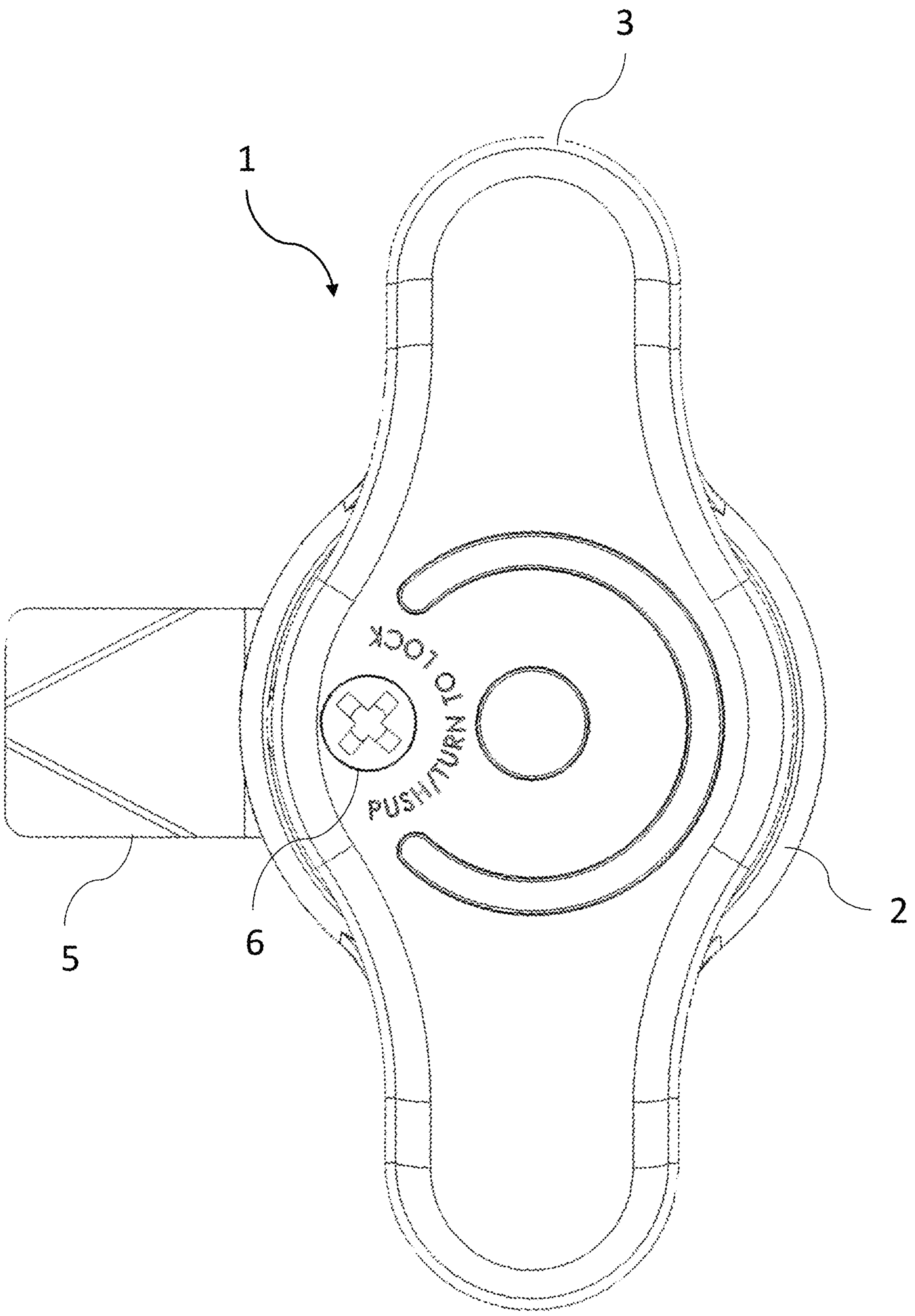
FIG. 2 shows a front view of the fitting according to one embodiment of the invention.
Figure 3:
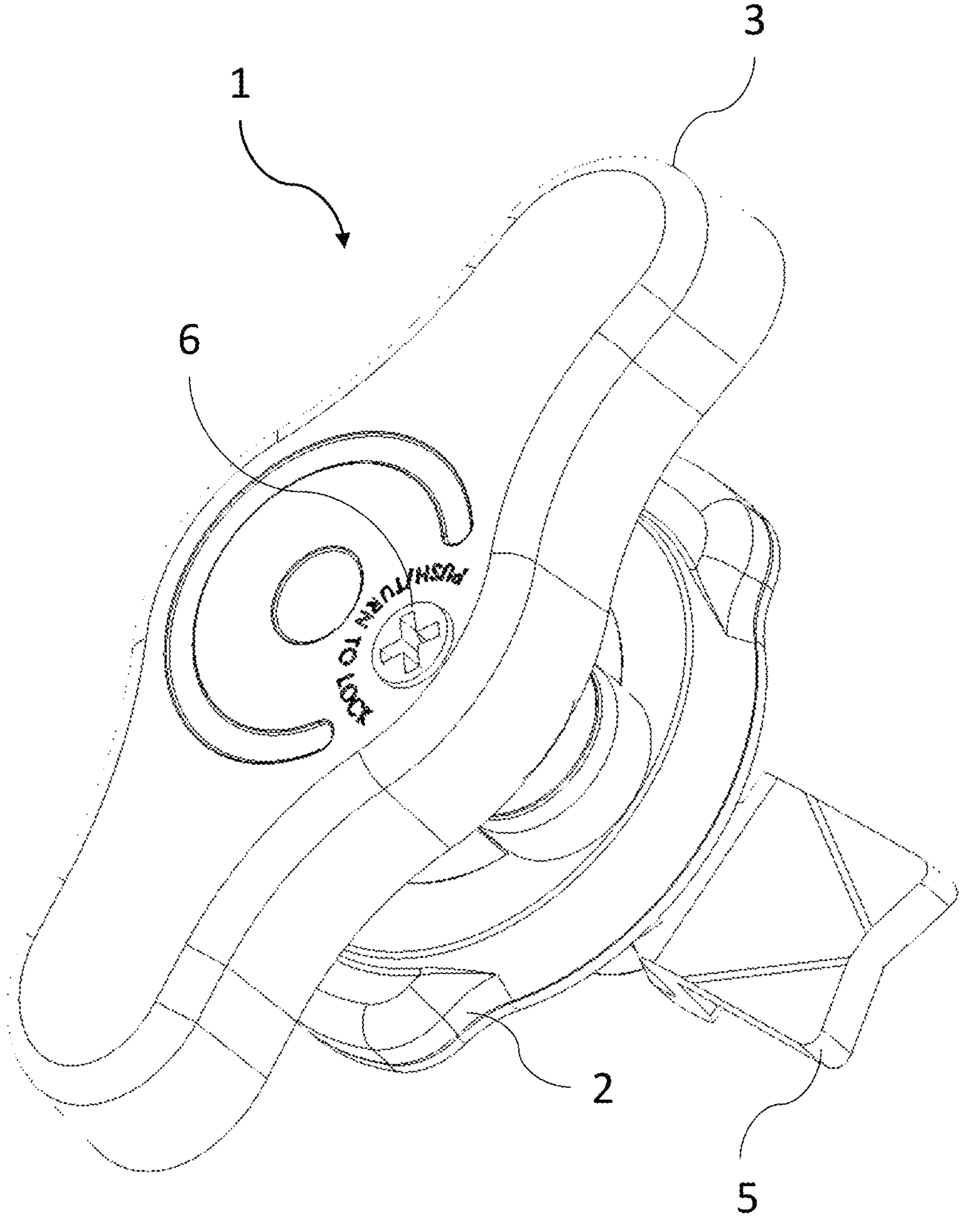
FIG. 3 shows a perspective front view of the fitting according to one embodiment of the invention.

FIG. 2 shows a front view of the fitting 1 according to one embodiment of the invention. FIG. 3 shows a perspective front view of the fitting 1 according to the same embodiment.

In this particular embodiment, the fitting 1 is a handle arrangement, wherein the actuation member 5 is a cam member configured to be operated between a locking position and an unlocking position by means of a handle 3 coupled to the cam member 5 via the shaft 7. In the locking position, when the fitting 1 is arranged to an openable element 100, the cam member 5 engages with a frame plate so as to keep the openable element 100 in a locked state. In the unlocking position, the cam member 5 does not engage with the frame plate, thereby allowing the openable element 100 to open.

Moreover, the fitting 1 further comprises a push cylinder lock 6 which can be operated between a locking state and an unlocking state. In the locking state, the push cylinder lock 6 engages with the housing 2, thereby rotationally locking the handle 3 to the housing 2. In the unlocking state, the push cylinder lock 6 does not engage with the housing 2 such that the handle 3 is rotationally locked with the housing 2. The push cylinder lock 6 may be moved between the locking state and the unlocking state by first pushing the push cylinder lock towards the housing 2 and then rotating the push cylinder lock 6 about its axis. Although not shown, the push cylinder lock 6 may be configured to only be moveable between the locking state and the unlocking state by means of a key.

Figure 4:
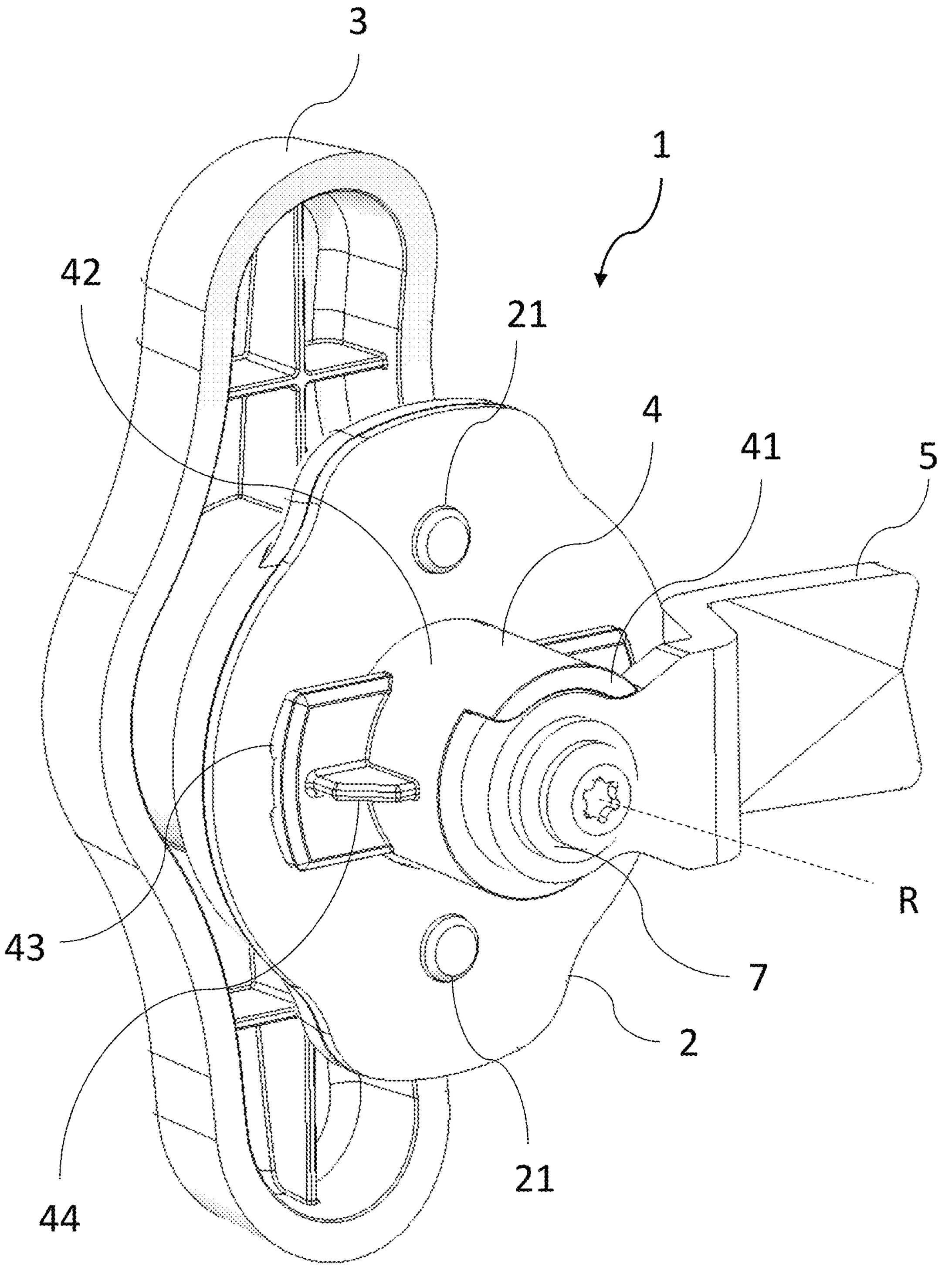
FIG. 4 shows a perspective back view of the fitting according to one embodiment of the invention.
Figure 5:
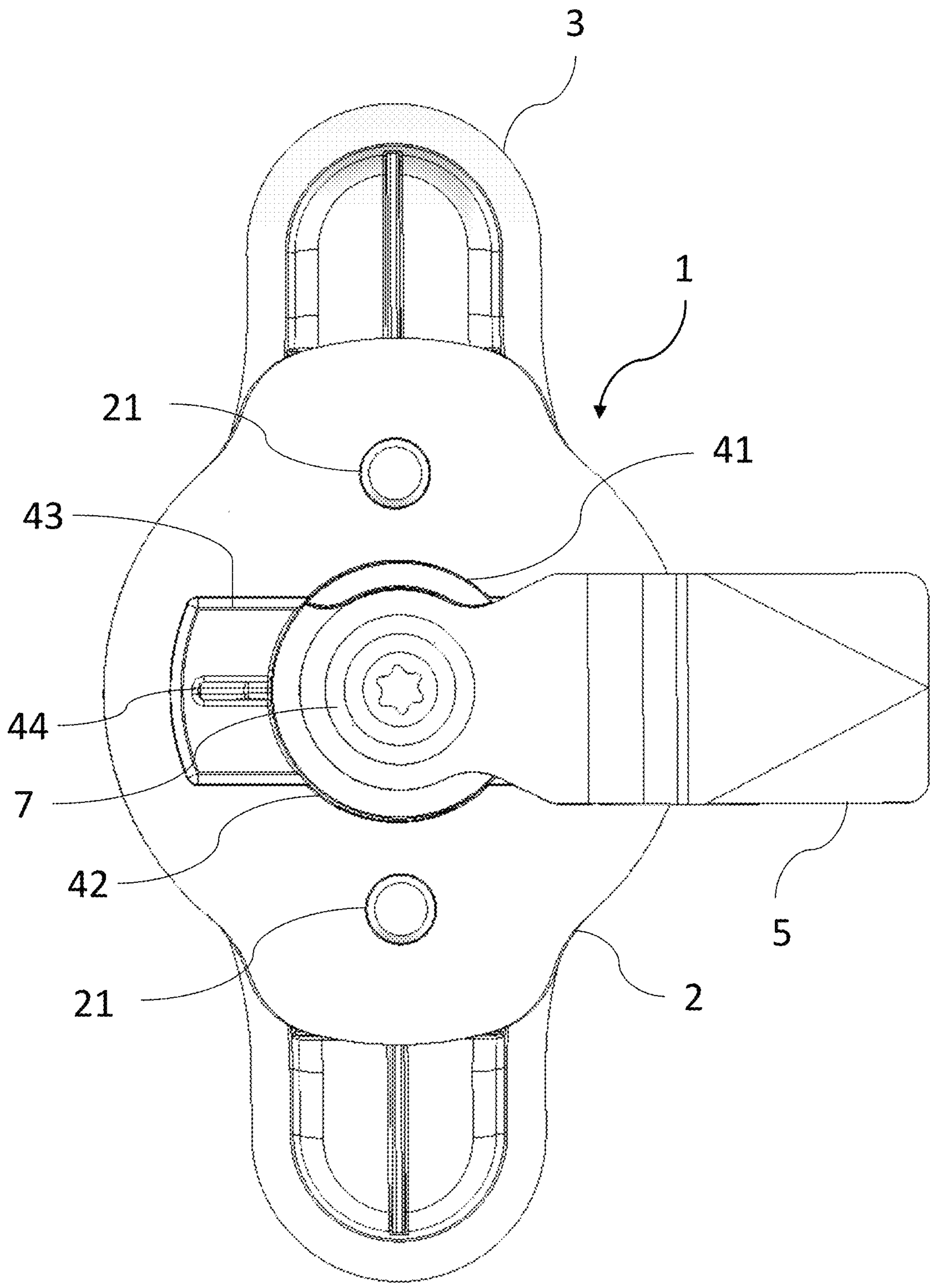
FIG. 5 shows a back view of the fitting according to one embodiment of the invention.

FIG. 4 shows a perspective back view of the fitting 1 according to one embodiment of the invention. FIG. 5 shows a back view of the fitting according to the same embodiment. In these figures, the fixing member 4 is in an inserting position, meaning it is in a position where it can be inserted through the hole image 110. When rotating the actuation member 5, in this case a cam member, in a counterclockwise direction about the rotational axis R, the fixing member 4 is actuated to rotate also about the rotational axis R from the inserting position shown in FIG. 4 to a fixing position wherein the fixing member 4 via radial portions 43 engages with a respective fixing protrusion 21 extending out from the housing 2.

The fitting 1 may also be embodied so that the fixing member 4 is further rotatable between the inserting position and a second position when the fixing member 4 is rotated in a second rotational direction opposite the first rotational direction, in which position the fixing member 4 engages with a fixing protrusion 21 extending from the housing 2 through the hole image 110 such that the fitting 1 is compressively fixed to said openable element. The fixing member 4 is configured to be rotatable between the inserting position and the second fixing position by means of the actuation member 5. This allows for the fitting to be reconfigurable for openable elements regardless whether they are configured for right-hand operative use or left-hand operative use. In FIG. 4, the second fixing position is reached by rotating the actuation member 5, in this case a cam member, in a clockwise direction about rotational axis R so that the actuation member 5 engages with the fixing member 4 from the opposite direction. The fixing member 4 comprises an axial protrusion 41 extending only partially in the circumferential direction about the shaft 7 by which the fixing member is engageable with the actuation member 5. As is shown in FIG. 4, the actuation member 5, in this case a cam member 5, will engage with the fixing member 4 when rotated in a counter-clockwise direction but is free to rotate in the opposite direction (until it engages with the fixing member 4 from the opposite direction). The axial protrusion 41 is arc shaped. The axial protrusion 41 is arc-shaped so that its curvature corresponds to a center rotation portion of the actuation member 4. The arc shaped axial protrusion 41 has an arc length of about 90 degrees. Regardless whether the actuation member 5 rotates in a counterclockwise or clockwise direction, it will during its rotation engage with the axial protrusion 41, thereby causing the fixing member 4 to rotate by means of the actuation member 5.

Thus, the fitting 1 is reconfigurable for being arranged to openable elements 100 which are either right-hand operated or left-hand operated.

Moreover, as shown in FIGS. 4 and 5, the fixing member 4 further comprises a main cylinder body 42, and two radial portions 43 extending from the main cylinder body 42 in opposite directions. The fixing member 4 is engageable with a respective fixing protrusion 21 via said radial portions 43. When the fixing member 4 engages with the fixing protrusions 21, it is in a fixing position. As can be seen in FIG. 4, the fixing member 4 can be rotated into a first fixing position and a second fixing position corresponding to the fixing members 4 orientation in the first fixing position but flipped 180 degrees. The two fixing positions correspond to two different configurations associated for openable element that are configured for right-hand operative use or left-hand operative use.

The fixing member 4 further comprises supporting portions 44 extending between the main cylinder body 42 and the radial portions. These provide support to the radial portions 43, thereby preventing them to flex away too much from the fixing protrusions 21 when interacting with these.

Moreover, the rotational angle of the fixing member 4 when rotated between the inserting position and the first fixing position is about 90 degrees. The rotational angle of the fixing member 4 when rotated between the inserting position and the second fixing position is also about 90 degrees.

Figure 10:
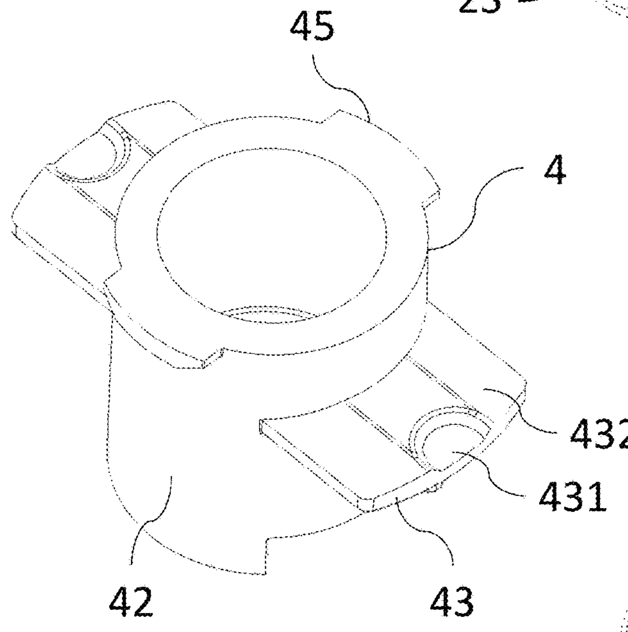
FIG. 10 shows a perspective view of the fixing member of the fitting according to one embodiment of the invention.

As shown in FIG. 10, each of the radial portions 43 comprises a fixing recess 431 for receiving said fixing protrusion 21 when the fixing member 4 is rotated into a fixing position. The fixing recess 431 is adjacent to an elevated region 432 causing said radial portions 43 to momentarily flex away from said fixing protrusions 21 when said fixing protrusions 21 are being received in said fixing recesses 431. These fixing recesses 431 are shown in detail in FIG. 10 and have a circular shape. Moreover, said elevated region 432 tapers away in a radially perpendicular direction from said fixing recess 431.

Figure 6:
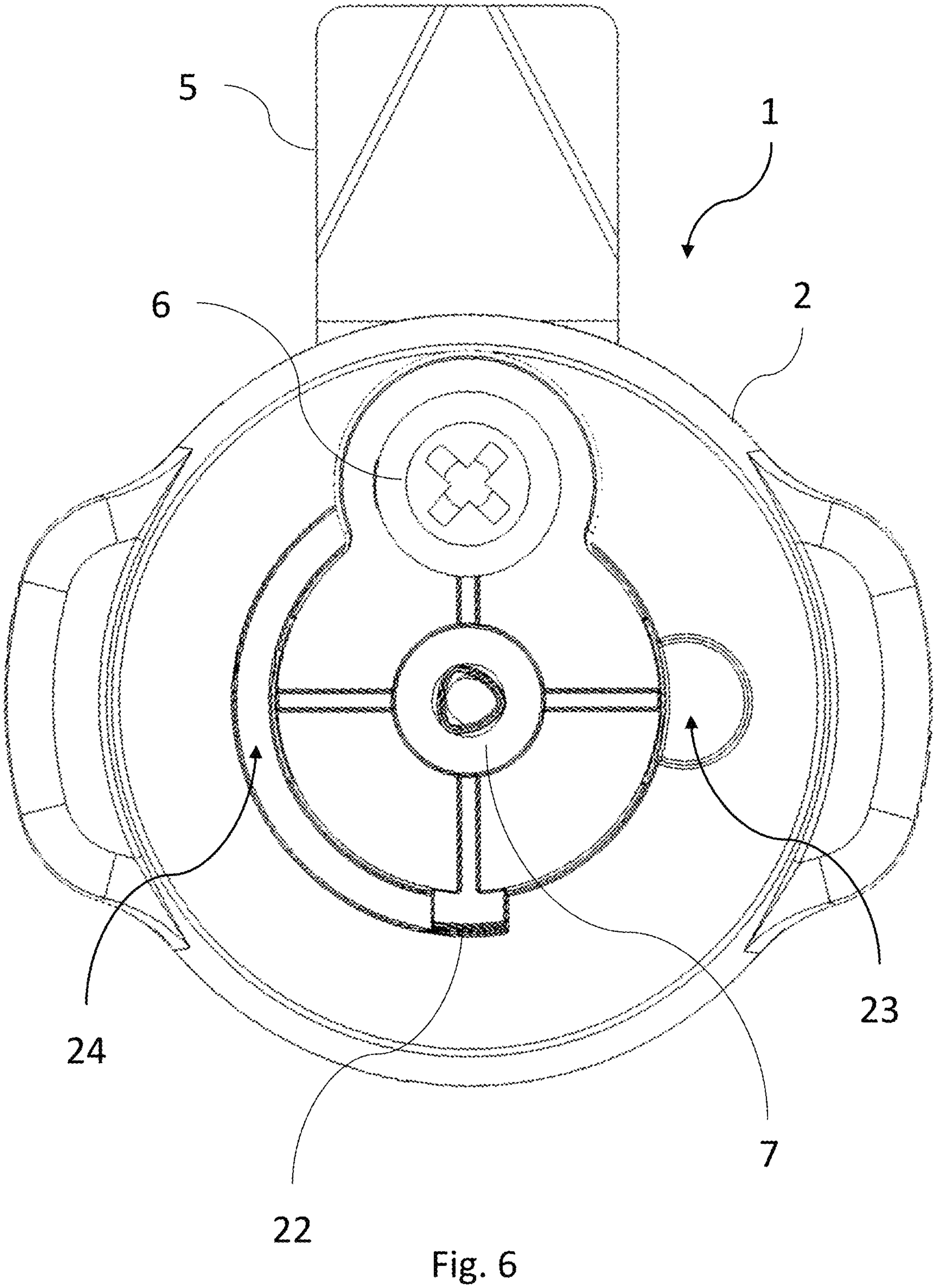
FIG. 6 shows a front view of the fitting according to one embodiment of the invention wherein the handle is omitted from view.

FIG. 6 shows a top view of the fitting 1 according to one embodiment wherein the handle is omitted from view. The fitting 1 further comprises a rotational stop block 22 rotatably coupled with the actuation member 5 and configured to slide along a predetermined groove 24 of the housing 2 having a length substantially corresponding to a half revolution of the actuation member 5. The rotational stop block 22 is coupled to the shaft 7, thereby preventing the shaft 7 from rotation freely beyond the rotational range defined by the groove 24. Consequently, the actuation member 5, in this case a cam member, and the handle is also limited to the same rotational range as the shaft. The groove 24 may however be adapted to extend differently about the shaft, thereby defining a different rotational range for the shaft. Thus, this feature of limiting the shaft to a half revolution is optional.

As previously explained, the fitting 1 according to one embodiment further comprises a push cylinder 6. The push cylinder lock 6 is coupled with the shaft 7 and configured to be received, when in a locking state, in a push cylinder lock recess 23 of the housing 2, regardless whether the fixing member 4 is moved into the first fixing position or the second fixing position. As shown in FIG. 6, the push cylinder lock recess 23 for receiving the push cylinder lock 6 is located on an opposite side of the shaft 7 relative the predetermined groove 24 at a midpoint of a circular arc extending between the endpoints of the groove 24 of the housing 2. Although not shown in FIGS. 9-11, the push cylinder lock recess 23 comprises a slot extending into the cylindric wall surface, which slot is configured to receive a push cylinder lock member as the push cylinder lock is rotated into a locking state. This allows the push cylinder lock 6 to be kept in the locking state, which is otherwise biased to move into an unlocking state by means of a coil spring (not shown).

Figure 7:
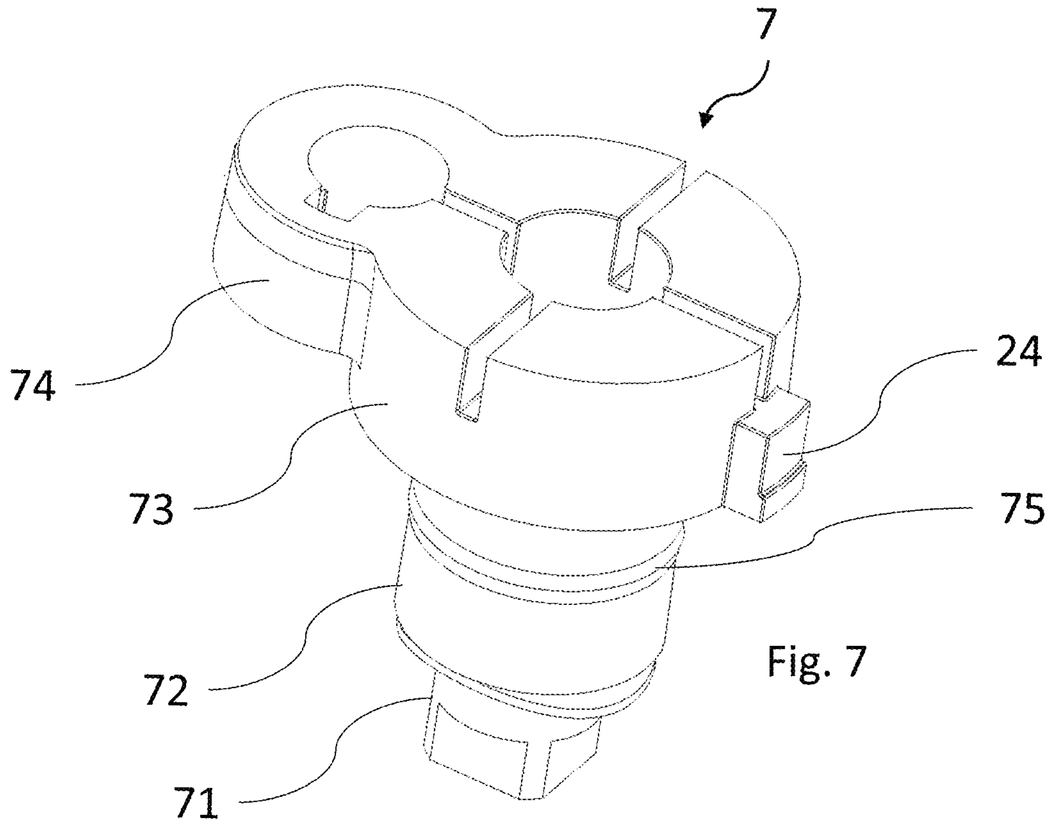
FIG. 7 shows a perspective view of the shaft of the fitting according to one embodiment of the invention.
Figure 8:
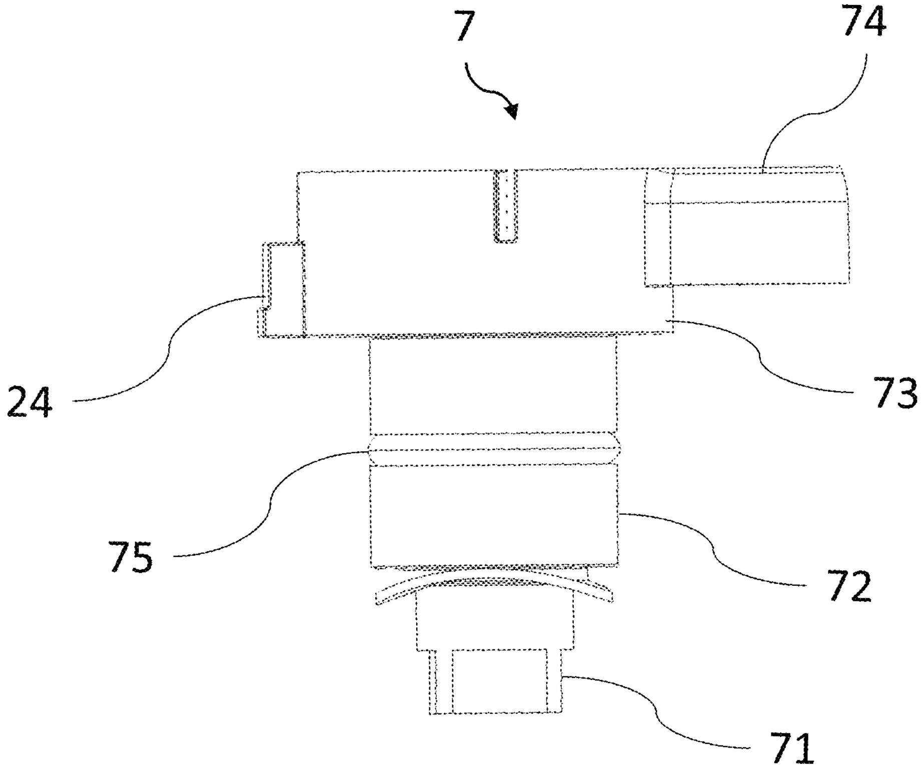
FIG. 8 shows a side view of the shaft of the fitting according to one embodiment of the invention.

FIG. 7 shows a perspective view of the shaft 7 of the fitting 1 according to one embodiment of the invention. FIG. 8 shows a side view of the shaft 7 according to the same embodiment. The shaft 7 comprises a first shaft portion 71 for engaging with the actuation member 5. The shaft 7 comprises a second shaft portion 72 for providing a surface along which the fixing member 4 may slide along as it is rotated about the shaft. The shaft 7 comprises a third shaft portion 73 for axially fixing the shaft 7 to the housing 2 while still being rotatable relative the housing 2. The second shaft portion 72 is arranged axially between the first shaft portion 71 and the third shaft portion 73. The rotational stop block 24 is arranged to the third shaft portion. The shaft 7 further comprises a radially extending shaft portion 74 comprising a recess for receiving the push cylinder lock 6. The first shaft portion 71 has two pairs of mutually parallel sides in an axial cross section. These allow the actuation member 5 to be rotationally fixed to the shaft 7. The second shaft portion 72 comprises two cylindric portions with a groove arranged therebetween for retaining a rubber gasket 75. The rubber gasket 75 is configured to provide friction to the fixing member 4 when rotated.

Figure 9:
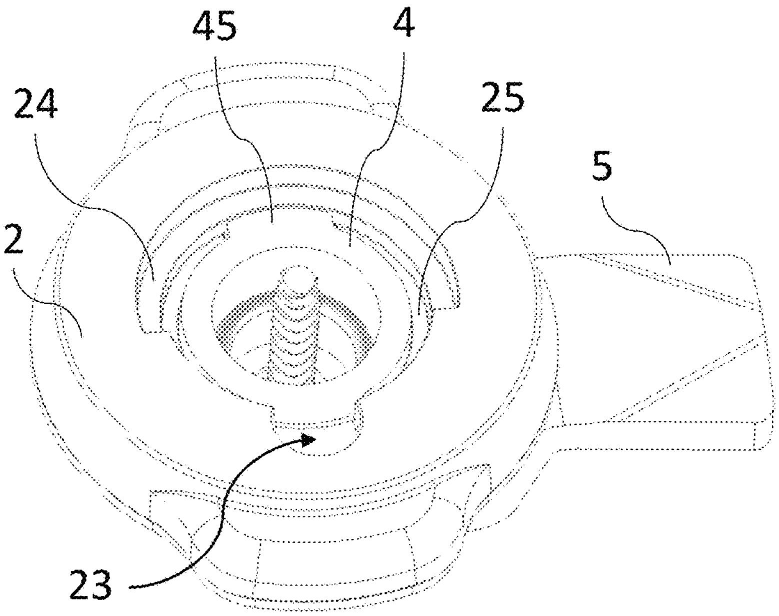
FIG. 9 shows a perspective view of the fitting according to one embodiment of the invention wherein the handle and shaft are omitted from view.
Figure 11:
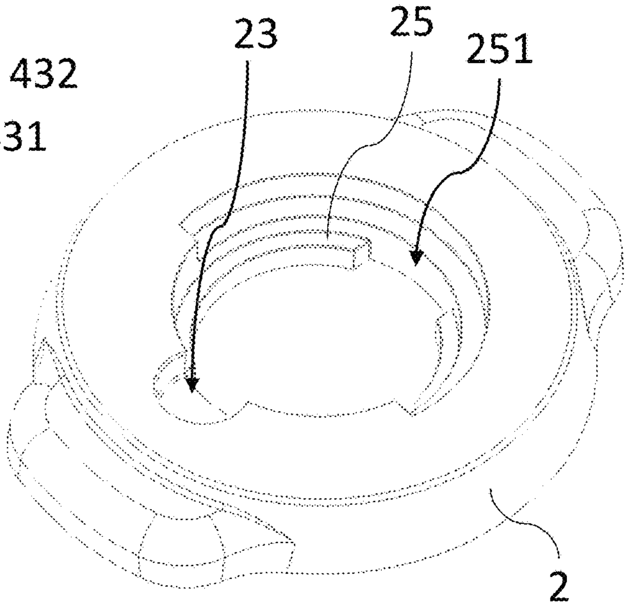
FIG. 11 shows a perspective view of the housing of the fitting according to one embodiment of the invention.

As can be seen in FIGS. 9-11, the fixing member 4 comprises two flanges 45 arranged on opposite sides of the main cylinder body 42, which flanges 45 are configured to engage with an internal groove 25 of the housing 2 by which the fixing member 4 is axially fixed to the housing 2 relative the shaft 7. The internal groove 25 substantially extends completely about the shaft 7 along an interior surface of the housing 2 apart from two open sections arranged opposite each other which are configured to define a path for the flanges 45 to move as the fixing member 4 is inserted into the housing 2 during assembly. The internal groove 25 and the predetermined groove 24 are offset relative each other in a direction parallel to the rotational axis defined by the shaft 7.

Figure 12:
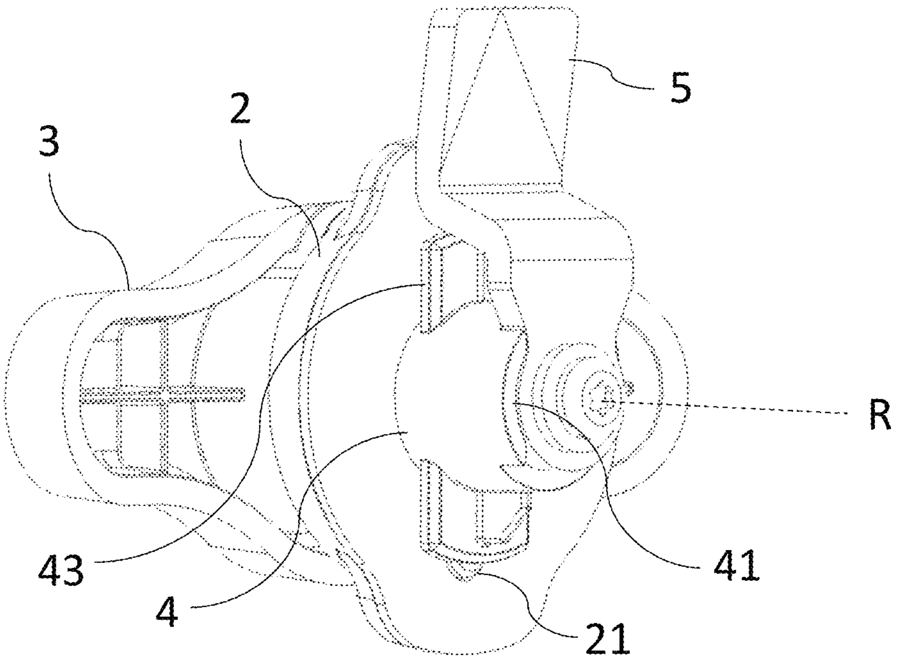
FIG. 12 shows a perspective back view when the fixing member is in a fixing position and the actuation member (in this case a cam member) is in an unlocking position.
Figure 13:
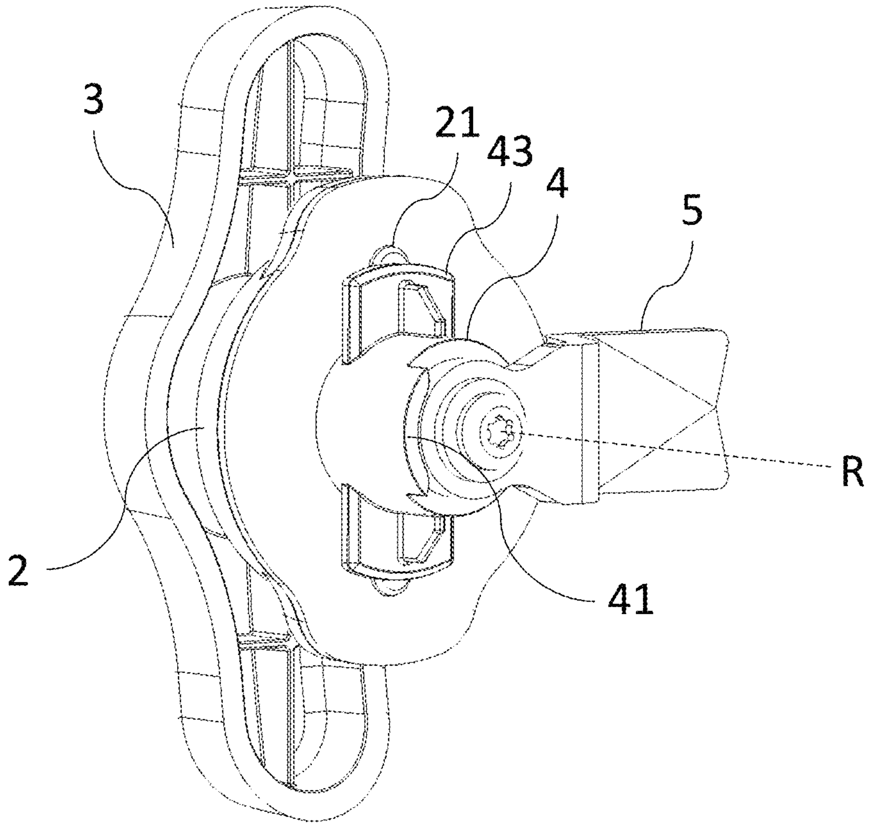
FIG. 13 shows a perspective back view when the fixing member is in a fixing position and the actuation member (in this case a cam member) is in a locking position.

FIGS. 12 and 13 show the fitting 1 according to one embodiment. In both figures, the fixing member 4 is in a fixing position. However, the actuation member 5, in this case a cam member, is in an unlocking position in FIG. 12 while in a locking position in FIG. 13. The cam member 5 is rotatable about the rotational axis R between the locking position and the unlocking position by means of the handle 3 coupled to the cam member 5 by means of the shaft 7. Starting from the position in FIG. 4, the cam member 5 is rotated in a counterclockwise direction as seen in FIG. 4 such that the cam member 5 pushes the fixing member 4 to the fixing position shown in FIG. 12, thereby engaging with the fixing protrusions 21 of the housing 2 extending through the hole image 110. After fixing the fitting 1 to the openable element 100 by the fixing member 4 in the fixing position, the cam member 5 may be operated in either clockwise or counterclockwise direction from the position shown in FIG. 13 to open positions to open the openable element 100.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A fitting (1) for an openable element (100) such as a door, locker, hatch, or window, the fitting comprising:

a housing (2) arranged at one side of said openable element (100);

a shaft (7) extending from the housing (2), such that when the fitting (1) is arranged to the openable element (100), the shaft extends through a hole image (110) of the openable element (100); and an actuation member (5) arranged on the shaft and rotatable relative to the housing (2), the fitting (1) further comprising a fixing member (4) arranged axially along the shaft (7) between the housing (2) and the actuation member (5), such that the fixing member (4) is rotatable relative to the housing (2) and the shaft (7) between:

an inserting position allowing the fixing member (4) and the actuation member (5) to be inserted into the hole image (110) of the openable element (100) when said fitting (1) is being arranged to said openable element (100), and a first fixing position when the fixing member (4) is rotated in a first rotational direction, in which position the fixing member (4) engages with a fixing protrusion (21) extending from the housing (2)

through the hole image (110), such that the fitting (1) is compressively fixed to said openable element (100).

2. The fitting (1) according to claim 1, wherein the fixing member (4) is rotatable between the inserting position and the first fixing position by the actuation member (5).

3. The fitting (1) according to claim 1, wherein the fixing member (4) is further rotatable between the inserting position and a second fixing position when the fixing member (4) is rotated in a second rotational direction opposite the first rotational direction, in which position the fixing member (4) engages with the fixing protrusion (21) extending from the housing (2) through the hole image, such that the fitting (1) is compressively fixed to said openable element.

4. The fitting (1) according to claim 3, wherein the fixing member (4) is rotatable between the inserting position and the second fixing position by the actuation member (5).

5. The fitting (1) according to claim 3, wherein a rotational angle of the fixing member (4) when rotated between the inserting position and the first fixing position and/or between the inserting position and the second fixing position is 90 degrees.

6. The fitting (1) according to claim 3, further comprising a push cylinder lock (6) coupled with the shaft and received, when in a locking position, in a push cylinder lock recess (23) of the housing (2), when the fixing member (4) is moved into the first fixing position or the second fixing position.

7. The fitting (1) according to claim 6, further comprising a rotational stop block (22) rotatably coupled with the actuation member (5) and configured to slide along a predetermined groove (24) of the housing (2) having a length substantially corresponding to a half revolution of the actuation member (5).

8. The fitting (1) according to claim 7, wherein the push cylinder lock recess (23) for receiving the push cylinder lock (6) is located on an opposite side of the shaft relative the predetermined groove (24) at a midpoint of a circular arc extending between endpoints of the groove (24) of the housing (2).

9. The fitting (1) according to claim 1, wherein the fixing member (4) comprises an axial protrusion (41) extending only partially in a circumferential direction about the shaft (7) by which the fixing member (4) is engageable with the actuation member (5).

10. The fitting (1) according to claim 9, wherein the axial protrusion (41) is arc shaped, with an arc length between 75-105 degrees.

11. The fitting (1) according to claim 1, wherein the fixing member (4) comprises one or more flanges engaging with an internal groove of the housing (2) by which the fixing member (4) is axially fixed to the housing (2) relative the shaft.

12. The fitting (1) according to claim 1, wherein the fixing member (4) further comprises a main cylinder body, and at least one radial portion (43) extending from the main cylinder body by which the fixing member (4) is engageable with the fixing protrusion (21) corresponding to the first fixing position.

13. The fitting (1) according to claim 12, wherein the fixing member (4) further comprises at least two radial portions (43) radially extending from two opposite sides of the main cylinder body (42) by which the fixing member (4) is engageable with a respective fixing protrusion (21) corresponding to one of said fixing positions.

14. The fitting (1) according to claim 9, wherein at least one of said at least one radial portions (43) comprises a fixing recess for receiving said fixing protrusion (21), wherein said fixing recess is adjacent to an elevated region causing said at least one radial portion (43) to momentarily flex away from said fixing protrusion (21) when said fixing protrusion (21) is being received into said fixing recess.

15. The fitting (1) according to claim 14, wherein said elevated region tapers away in a radially perpendicular direction from said fixing recess.

16. The fitting (1) according to claim 15, wherein the fixing member (4) comprises one or more supporting portions (44) extending between the main cylinder body (42) and each of the at least one radial portions (43).

17. An openable element (100) comprising:

a hole image (110) adapted in size and shape to receive a fitting (1), the fitting comprising:

a housing (2) arranged at one side of the openable element (100);

a shaft (7) extending from the housing (2), such that when the fitting (1) is arranged to the openable element (100), the shaft extends through the hole image (110) of the openable element (100); and an actuation member (5) arranged on the shaft and rotatable relative to the housing (2), the fitting (1) further comprising a fixing member (4) arranged axially along the shaft (7) between the housing (2) and the actuation member (5), such that the fixing member (4) is rotatable relative to the housing (2) and the shaft (7) between:

an inserting position allowing the fixing member (4) and the actuation member (5) to be inserted into the hole image (110) of the openable element (100) when said fitting (1) is being arranged to said openable element (100), and a first fixing position when the fixing member (4) is rotated in a first rotational direction, in which position the fixing member (4) engages with a fixing protrusion (21) extending from the housing (2) through the hole image (110) such that the fitting (1) is compressively fixed to said openable element (100).

18. The openable element (100) according to claim 17, wherein the openable element is a door, locker, hatch, or window.

* * * * *